(12) United States Patent
Sundaresan

(10) Patent No.: US 6,237,134 B1
(45) Date of Patent: *May 22, 2001

(54) METHOD OF, SYSTEM FOR, AND ARTICLE OF MANUFACTURE FOR PROVIDING A GENERIC ADAPTOR FOR CONVERTING FROM A NON-FUTURE FUNCTION POINTER TO A FUTURE FUNCTION OBJECT

(75) Inventor: Neelakantan Sundaresan, San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/815,231

(22) Filed: Mar. 12, 1997

(51) Int. Cl.[7] .................................................. G06F 9/445
(52) U.S. Cl. .......................... 717/1; 717/2; 717/5; 717/6; 717/11
(58) Field of Search .................................... 395/705, 706, 395/701; 717/1, 2, 11

(56) References Cited

U.S. PATENT DOCUMENTS

| 4,344,134 | 8/1982 | Barnes | 364/200 |
| 4,347,498 | 8/1982 | Lee et al. | 340/825.02 |
| 4,825,360 | * 4/1989 | Knight, Jr. et al. | 395/676 |
| 4,843,540 | 6/1989 | Stolfo | 364/200 |
| 4,845,744 | 7/1989 | DeBenedictis | 379/221 |
| 4,860,201 | 8/1989 | Stolfo et al. | 364/200 |
| 5,404,521 | 4/1995 | Murray | 395/650 |
| 5,535,393 | 7/1996 | Reeve et al. | 395/700 |
| 5,764,993 | 6/1998 | Shindo | 395/709 |

OTHER PUBLICATIONS

Mitchell et al., "Real–Time Programming in the Concurrent Object–Oriented Language TAO", IEEE, pp 179–181, May 1996.*

Alverson et al., "Exploiting Heterogenous Parallelism on a Multithreaded Multiprocessor", ACM digital, pp 188–197, Jun. 1992.*

(List continued on next page.)

Primary Examiner—Mark R. Powell
Assistant Examiner—Ted T. Vo
(74) Attorney, Agent, or Firm—Prentiss W. Johnson

(57) ABSTRACT

A generic adaptor for converting from a non-future function pointer to a future function object is provided by a future template class that provides type definitions and member functions for future-based operations and by a future template function that is an adaptor from a non-future function pointer to an object that is an instance of the future template class instance. The generic adaptor takes a non-future function pointer, builds a future function object by passing the non-future function pointer to a constructor of the future function template class instance, and returns the future function object. The future template class is a subclass of a template class of the non-future function. This future template class is defined for a function such that the class exports a type definition for the future function type it defines; such that a constructor takes a function pointer corresponding to the non-future function and saves the function pointer; and such that a member operator takes a list of arguments to be passed to the saved function pointer, schedules a task to compute the function, and returns a future function object.

15 Claims, 7 Drawing Sheets

OTHER PUBLICATIONS

Lavender et al., "A Polymorphic Future and First–Class Function Type for Concurrent Object–Oriented Programming", National Science Foundation, pp 1–19, 1992.*

Halstead, Robert H., Jr. *Multilisp: A Language for Concurrent Symbolic Computation.* ACM Transactions on Programming Languages and Systems, vol. 7, No. 4, pp. 501–538, Oct. 1985.

Yokote, Yasuhiko. *The Design and Implementation of Concurrent Smalltalk*, World Scientific Series in Computer Science, vol. 21 1990.

Leddy, William J., and Smith, K. Stuart, *The Design of the Experimental Systems Kernel.* Proceedings of the Fourth Conference on Hypercubes, Concurrent Computers and Applications, Monterey, CA, 1989, pp. 737–743.

Liskov, Barbara and Shrira, Liuba. *Promises: Linguistic Support for Efficient Asynchronous Procedure Calls in Distributed Systems.* Proceedings of the SIGMPLAN'88 Conference on Programming Language Design and Implementation, Atlanta, Georgia pp. 260–267, Jun. 1988.

Reppy, John H., Concurrent ML: *Design, Application and Semantics*, Concurrent ML Manual. AT&T Bell Laboratories, Feb. 1993, Version 0.9.8.

Lavender, R. Greg and Kafura, Dennis G. A Polymorphic Future and First–class Function Type for Concurrent Object–Oriented Programming. Sponsored in part by National Science Foundation Grant CCR–9104013.

Callahan, David and Smith, Burton. A Future–based Parallel Language For a General–purpose Highly–parallel Computer. Tera Computer Company, 400 N. 34th Street, Suite 300, Seattle, WA 98103. ARPA Order No. 6512, Program Code No. E20 issued by DARPA/CMO under Contract #MDA972–89–C–0002 and sponsored by the Defense Advanced Research Project Agency Information Science and Technology Office.

Sheffler, Thomas J., The Amelia Vector Template Library, Parallel Programming Using C++, Scientific & Engineering Computation Series, 1996, pp. 43–89.

Zhang, Shipei; Sokolsky, Oleg; Smolka, Scott A.; On the Parallel Complexity of Model Checking in the Modal Mu–Calculus, Proceedings of the 1994 IEEE $9^{th}$ Annual Symposium on Logic in Computer Science, pp 154–164.

Clark F. Olson, Connectionist Networks for Feature Indexing and Object Recognition, Proceedings of the 1996 IEEE Computer Society Conference on Computer Vision and Pattern Recognition, pp. 907–912.

* cited by examiner

```
Future_pointer_to_Nary_function Template Class template <class Arg1, class Arg2, ..., class ArgN, class Result>
class future_pointer_to_Nary_function : public Nary_function<Arg1, Arg2, ..., ArgN, Result>
protected:
    pointer_to_Nary_function<Arg1, Arg2, ..., ArgN, Result> Nf;
public:
    typedef TaskN<Arg1, Arg2, ...,ArgN,Result>::future_type future_type;
    future_pointer_to_Nary_function(Result (*x)(Arg1, Arg2, ..., ArgN) : Nf(ptr_fun(f)){...}
    ~future_pointer_to_Nary_function(){}//clean up task lists }
    future_type operator()(Arg1, Arg2, ..., ArgN);
...
};
```

FIG. 1

```
ThreadN template class                                            ⎫
                                                                  ⎬ 200
template <class Arg1, class Arg2, ..., class ArgN, class Result>  
class ThreadN : public Thread {
public:
    typedef ThreadN<Arg1, Arg2, ..., ArgN, Result> future_type;
    ThreadN(ptr_to_Nary_function<Arg1, Arg2, ..., ArgN, Result>, Arg1, Arg2, ..., ArgN);
    virtual ~ThreadN();
    Result operator()(future_type f);
};
```

FIG. 2

```
              future_ptr_fun adaptor template function                          ⎫
                                                  ⌐── 320                      ⎬ 300
template <class Arg1, class Arg2, ..., class ArgN, class Result>
future_pointer_to_Nary_function<Arg1, Arg2, ..., ArgN, class Result>
future_ptr_fun(Result (*x)(Arg1, Arg2, ..., ArgN)) {
    return future_pointer_to_Nary_function<Arg1, Arg2, ..., ArgN, Result> (x);
}
```
          330                360   340

FIG. 3

```
future_pointer_to_binary_function template class template <class Arg1, class Arg2, class Result>
class future_pointer_to_binary_function : public binary_function<Arg1, Arg2, Result >{
protected:
    pointer_to_binary_function<Arg1, Arg2, Result> bin_f;
public:
    typedef Task2 <Arg1, Arg2, Result>::future_type future_type;
    future_pointer_to_binary_function(Result (*x)(Arg1, Arg2) : bin_f(ptr_fun(f)){...}
    ~future_pointer_to_binary_function() {}//clean up task lists }
    future_type operator()(Arg1, Arg2);
};
```
410

```
future_ptr_fun adaptor template template <class Arg1, class Arg2, class Result>
future_pointer_to_binary_function<Arg1, Arg2, Result>
future_ptr_fun(Result (*x) (Arg1, Arg2)) {
    return future_pointer_to_binary_function<Arg1, Arg2, Result> (x);
}
```
420

FIG. 4

METHOD OF, SYSTEM FOR, AND ARTICLE OF MANUFACTURE FOR PROVIDING A GENERIC ADAPTOR FOR CONVERTING FROM A NON-FUTURE FUNCTION POINTER TO A FUTURE FUNCTION OBJECT

CROSS-REFERENCE TO RELATED APPLICATIONS

Application Ser. No. 08/820,393, filed concurrently herewith on Mar. 12, 1997 for A METHOD OF, SYSTEM FOR, AND ARTICLE OF MANUFACTURE FOR PROVIDING A GENERIC REDUCTION OBJECT FOR DATA PARALLELISM, currently co-pending, and assigned to the same assignee as the present invention;

Application Ser. No. 08/820,394, filed concurrently herewith on Mar. 12, 1997 for A METHOD OF, SYSTEM FOR, AND ARTICLE OF MANUFACTURE FOR PROVIDING A GENERIC ADAPTOR FOR CONVERTING FROM A SEQUENTIAL ITERATOR TO A PER-THREAD PARALLEL ITERATOR, currently co-pending, and assigned to the same assignee as the present invention; and Application Serial Number 08/815,234, filed concurrently herewith on Mar. 12, 1997 for A METHOD OF, SYSTEM FOR, AND ARTICLE OF MANUFACTURE FOR PROVIDING A DATA STRUCTURE SUPPORTING A GENERIC REDUCTION OBJECT FOR DATA PARALLELISM, currently co-pending, and assigned to the same assignee as the present invention.

The foregoing copending applications are incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the fields of generic programming and parallel programming, and more particularly to a generic adaptor for converting from a non-future function pointer to a future function object.

2. Description of the Related Art

Parallel Programming Futures

Parallel programming or parallel processing is a method of processing that executes on a computer containing two or more processors running simultaneously. A primary objective of parallel processing is dividing a task so that it may be distributed among the available processors. Parallel programming has developed the concept of futures which are place-holders for values or computations. Future abstractions are useful in parallel programming because they allow asynchronous computation by enabling delaying the computation of the value of an object until the value is required. Futures are also useful for writing parallel programs that look similar to their sequential counterparts.

The parallel programming arts have developed numerous futures mechanisms. The state of the art is represented by futures mechanisms such as the MultiLisp future primitive, the Argus promise type, the Concurrent Smalltalk Cbox, the Concurrent ML future functor, the Mentat return-to-future, the ES-Kit future ref, the polymorphic future, and the future for a future-based parallel language for a general-purpose highly-parallel computer.

Future mechanisms such as the MultiLisp future primitive as taught by Halstead (Halstead, Robert H., Jr. MultiLisp: A Language for Concurrent Symbolic Computation. ACM Transactions on Programming Languages and Systems, 7(4):501–538, October 1985) and the Concurrent Smalltalk Cbox as taught by Yokote (Yokote, Yasuhiko. The Design and Implementation of Concurrent Smalltalk. World Scientific, 1990) provide polymorphic futures, those with arbitrary future types and dynamic type resolution at runtime.

Future mechanisms such as the MultiLisp future primitive as taught by Halstead, the Concurrent Smalitalk Cbox as taught by Yokote, the ES-Kit future ref as taught by Leddy et al. (Leddy, Bill and Smith, Kim. The Design of the Experimental Systems Kernel. In Proceedings of the Conference on Hypercube and Concurrent Computer Applications, Monterey, Calif., 1989) also provide implicit type conversion.

Concurrent Smalltalk Cbox as taught by Yokote and the ES-Kit future ref as taught by Leddy et al. allow user-defined operations as part of the future, known as computational futures.

Additional futures mechanisms include the teachings of the Argus promise type as taught by Liskov et al. (Liskov, Barbara and Shrira, Luiba. Promises: Linguistic Support for Efficient Asynchronous Procedure Calls in Distributed Systems. In Proceedings of the SIGPLAN'88 Conference on Programming Language Design and Implementation, pages 260–267, June 1988); the Concurrent ML future functor as taught by Reppy (Reppy, John H. Concurrent Programming with Events: The Concurrent ML Manual. AT&T Bell Laboratories, February 1993. version 0.9.8); the Mentat return-to-future as taught by Grimshaw (Grimshaw, Andrew S. Easy-to-use Object-oriented Parallel Processing with Mentat. IEEE Computer, pages 39–51, May 1993); the polymorphic future as taught by Lavender et al. (Lavender, R. Greg and Kafura, Dennis G. A Polymorphic Future and First-class Function Type for Concurrent Object-Oriented Programming. Sponsored in part by National Science Foundation grant CCR-9104013); and the future for a future-based parallel language for a general-purpose highly-parallel computer as taught by Callahan et al. (Callahan, David and Smith, Burton. A Future-based Parallel Language For a General-purpose Highly-parallel Computer. Tera Computer Company, 400 N. 34th Street, Suite 300, Seattle, Wash. 98103. ARPA Order No. 6512, Program Code No. E20 issued by DARPA/CMO under Contract #MDA972-89-C-0002 and sponsored by the Defense Advanced Research Projects Agency Information Science and Technology Office).

Despite the above developments in future mechanisms and features, the prior art has failed to develop a generic future mechanism or a generic future abstraction for use in generic programming.

Generic Programming

Generic programming provides a paradigm that abstracts concrete efficient algorithms that may be combined with different data representations to produce a wide variety of useful software. Given N data types, M containers, and K algorithms as components of a software system, the generic programming paradigm provides a mechanism to reduce the possibly N*M*K implementations to N+M+K implementations. For instance, using this paradigm, a generic sorting algorithm may be instantiated to work with different aggregate data structures like linked lists or arrays. Originally developed in Ada and Scheme, a library implementing this paradigm in C++, known as the Standard Template Library or STL, has been adopted by the C++ ANSI standard committee.

The Standard Template Library

The standard template library implements the four abstractions of generic programming, data, algorithmic, structural, and representational, as a container class library in C++.

Data Abstractions

Data abstractions are data types and sets of operations on them. These are implemented as containers or template classes in C++. Templates or parameterized types in C++ provide a uniform interface and implementation abstractions for different data types. For instance, a template stack class may be instantiated to a stack of integers, a stack of doubles, or a stack of any user-defined type. Thus, for N data types only one template container class is provided which may be instantiated N ways.

Algorithmic Abstractions

Algorithmic abstractions are families of data abstractions with a common set of algorithms, known as generic algorithms. For instance, a sort algorithm could work on a linked list or a vector data abstraction. Algorithmic abstractions are implemented as template functions in C++, and are typically parameterized over iterators or structural abstractions.

Structural Abstractions

Structural abstractions are defined with respect to algorithmic abstractions. Structural abstractions are data types defined by data abstractions over which algorithmic abstractions may be instantiated. These structural abstractions are implemented as iterators in STL, and are data type templates exported by container classes. Algorithm templates work over iterators rather than directly over containers; therefore, a same algorithm template may be instantiated for different container instantiations. An iterator may be of one of the following kinds: input, output, forward, backward, or random-access. There are interfaces, depending on the kind of the iterator, that enable referencing and traversing data abstractions. The referencing operator is an overloaded * operator which returns the value at the position pointed to by the iterator. This operator may be used to read or write in an assignment expression the data pointed to by the iterator. Traversal operators include ++(auto-increment), −−(auto-decrement), +n (jump n positions forward), and −n (jump n positions backward).

Representational Abstractions

Representational abstractions are mappings from one structural abstraction to another. Representational abstractions are known as adaptors in STL, and are casting wrappers that change the appearance of a container (building a stack from a list), or change the appearance of an iterator (converting a random-access iterator to a bidirectional iterator).

Despite the above developments and benefits of both parallel programming and generic programming, both have failed to recognize the need for or provide a solution of a generic abstraction which may convert a non-future function pointer to a future function object to further the reuse of sequential algorithms in corresponding parallel implementations. As such, there is a need for a method of, apparatus for, and article of manufacture for providing a generic adaptor for converting from a non-future function pointer to a future function object.

SUMMARY OF THE INVENTION

The invention disclosed herein comprises a method of, a system for, and an article of manufacture for providing a generic adaptor for converting from a non-future function pointer to a future function object.

In accordance with one aspect of this invention, the generic adaptor takes a non-future function pointer and builds and returns a future function object.

In accordance with another aspect of this invention, the generic adaptor takes a non-future function pointer, builds a future function object by passing the non-future function pointer to the future function object's constructor, and returns the future function object.

In accordance with another aspect of this invention, the generic adaptor is a generic adaptor template function.

In accordance with another aspect of this invention, the generic adaptor template function cooperates with a future function object template class.

In accordance with another aspect of this invention, the future function object template class is a subclass of a template class of the non-future function.

In accordance with another aspect of this invention, the future function object template class is defined for a function such that:

this class exports a type definition for the future function type it defines;

a constructor takes a function pointer corresponding to the non-future function and saves the function pointer; and a member operator, the ( ) operator, takes a list of arguments to be passed to the saved function pointer, schedules a task to compute the function, and returns a future function object.

The present invention has the advantage of providing improved parallelization of sequential code.

The present invention has the further advantage of improving expressibility of parallel code.

The present invention has the further advantage of improving maintenance of parallel code.

The present invention has the further advantage of improving reuse of sequential code and parallel code.

BRIEF DESCRIPTION OF THE DRAWINGS

For a more complete understanding of the present invention and the advantages thereof, reference is now made to the Detailed Description in conjunction with the attached Drawings, in which:

FIG. 1 illustrates a future_pointer_to_N-ary_function template class definition in accordance with the present invention;

FIG. 2 illustrates a ThreadN template class definition in accordance with the present invention;

FIG. 3 illustrates a future_ptr_fun adaptor template function in accordance with the present invention;

FIG. 4 illustrates a future_pointer_to_binary_function template class definition and a future_ptr_fun adaptor template function in accordance with the present invention;

DESCRIPTION OF THE PREFERRED EMBODIMENT

Figure 5:
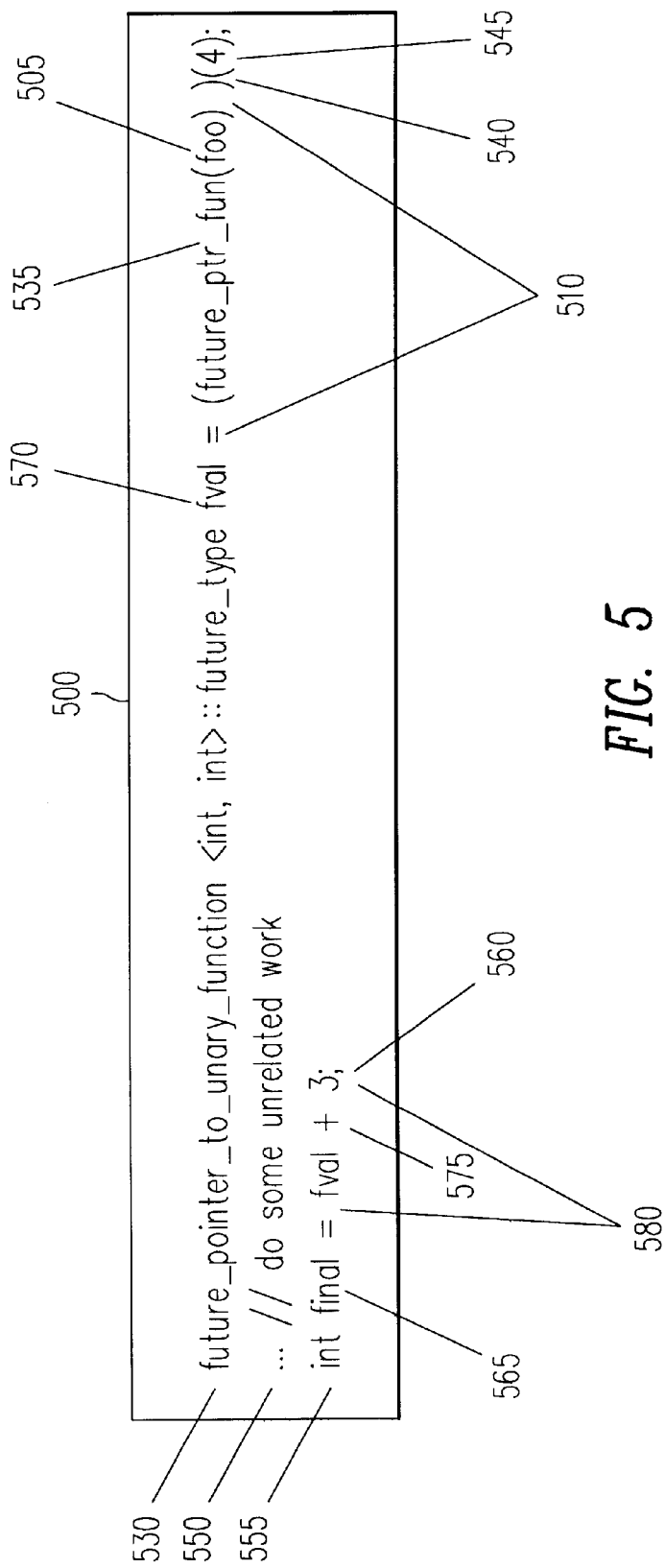
FIG. 5 shows an example of user program code illustrating how a user may use the present invention.

The present invention provides a generic adaptor for converting from a non-future function pointer to a generic computational future object by providing two facilities:

- a future_pointer_to_N-ary_function template class that provides type definitions and member functions for future-based operations; and
- a future_ptr_fun template function that is an adaptor from an N-ary function pointer to an object that is an instance of the future_pointer_to_N-ary_function class.

Template constructs are available in object-oriented programming languages, such as C++, and enable a programmer to define template classes which are parametric structure types and template functions which are parametric functions. Template classes are defined similar to normal C++ classes except for the template part, "< . . . >". The names that appear within the template part, "< . . . . >", are parameters, and instantiating these parameters with actual data types defines different class types. Template functions are also defined similar to normal C++ functions except for the template part, "< . . . >". The names that appear within the template part, "< . . . >", are parameters, and instantiating these parameters with actual data types defines different functions.

Generic programming facilities, such as the Standard Template Library (STL), may provide generic template functions and generic template function classes. The Standard Template Library offers N-ary_function template classes. STL defines N-ary_function template classes for N=1 and N=2. N-ary_function template classes for higher values of N may also be defined in a manner similar to the unary and binary N-ary_function template classes. The STL N-ary_function template classes are defined as follows:

```
template <class Arg1, class Arg2, . . ., class ArgN, class Result>
struct N-ary_function {
    typedef Arg1 first_argument_type;
    typedef Arg2 second_argument_type;
    . . .
    typedef ArgN Nth_argument_type;
    typedef Result result_type;
};
```

In addition to N-ary function template classes, STL also provides adaptors to convert arbitrary N-ary function pointers to N-ary function objects, known as ptr_to_N-ary_function Adaptors. These are defined as follows. First a template class N-ary_function is defined as above, and then a template function for the adaptor is defined as follows:

```
template <class Arg1, . . ., class ArgN,
class Result> : public N-ary_function<Arg1, . . .,
ArgN, Result> {
protected:
    Result (*ptr)(Arg1, . . ., ArgN);
public:
    pointer_to_N-ary_function(Result (*x)(Arg1, . . .,
        ArgN)) : ptr(x) {}
    Result operator()(Arg x1, . . . ArgN xN) {return ptr(x); }
}
template <class Arg1, . . ., class ArgN, class Result>
pointer_to_N-ary_function<Arg1, . . ., ArgN, Result> ptr_fun(
    Result (*x)(Arg1, . . ., ArgN)) {
    return pointer_to_N-ary_function<Arg1, . . ., ArgN, Result>(x);
}
```

Referring next to FIG. 1 through FIG. 8, class templates, code listings, a class inheritance hierarchy diagram, a behavior diagram, and an execution graph illustrating operations preferred in carrying out the present invention are shown. The conventions used in these Figure are well understood by those skilled in the art, and the Figures are sufficient to enable one of ordinary skill to write code in any suitable computer programming language.

The present invention allows a future function object adaptor to be defined for any N-ary function pointer (a function pointer that accepts N parameters) through the use of:

- a future_pointer_to_N-ary_function template class that provides the type definitions and member functions for future-based operations; and
- a future_ptr_fun template function that is an adaptor from an N-ary function pointer to an object of that is an instance of a future_pointer_to_N-ary_function class.

Future_pointer_to_N-ary_function Template Class

Referring first to FIG. 1, a future_pointer_to_N-ary_function template class 100 definition in C++ is illustrated. For convenience, this future_pointer_to_N-ary_function template class definition is also listed below:

```
template <class Arg1, class Arg2, . . ., class ArgN, class Result>
class future_pointer_to_N-ary_function : public N-ary_function<Arg1,
Arg2, . . .,ArgN, Result>{
protected:
    pointer_to_N-ary_function<Arg1, Arg2, . . ., ArgN, Result> Nf;
public:
    typedef TaskN<Arg1, Arg2, . . ., ArgN,
    Result>::future_type future_type;
    future_pointer_to_N-ary_function(Result (*x)(Arg1, Arg2, . . .,
        ArgN)): Nf(ptr_fun(f)){. . .}
    ~future_pointer_to_N-ary_function() {// clean up task lists }
    future_type operator()(Arg1, Arg2, . . ., ArgN);
};
```

The future_pointer_to_N-ary_function template class 100 has N+1 parameters: N parameters (Arg1 . . . , ArgN) 105 for the N argument types of the N-ary function 110 to be converted, and the last parameter (class Result) 115 for the result type of the N-ary function 110 to be converted.

The future_pointer_to_N-ary_function template class 100 is defined as a subclass of the N-ary_function template class 117 provided in STL. Although STL only defines unary (N=1) and binary (N=2) function template classes, those skilled in the art recognize that ternary, quarternary, or higher level N-ary function template classes may also be defined.

The future_pointer_to_N-ary_function template class 100 defines and exports a public type definition of future_type 120. This future_type 120 is the type of handle returned when a '( )' member operator 125 of an object of this future_pointer_to_N-ary_function class 100 is invoked. This_future type 120 is castable to Result type 115, i.e., its type is convertible to Result type.

The constructor 130 of the future_pointer_to_N-ary_function template class 100, which is defined by a member function with the same name as that of the class 145, takes one argument which is an N-ary function pointer 110. This N-ary function pointer 110 is converted into a pointer_to_N-ary_function object using the ptr fun adaptor 165 provided in STL. The pointer_to_N-ary_function object produced by the ptr_fun adaptor 165 conversion is stored in its member defined by Nf 175.

The future_pointer_to_N-ary_function template class 100 supports an "( )" operator 125 which is basically an invocation operator of the future function object. The "( )" operator 125 expects N arguments 185 (Arg1, Arg2, . . . , ArgN); creates a task 180 with these N arguments 185 and the N-ary function object 175; and returns a future_type object. The created task 180 is added to an internal list of tasks. When the destructor 190 of the future_pointer-to_N-ary_function object 100 is invoked (when the object is deleted or goes out of scope), this internal list and the tasks in that list are deleted and disposed.

The TaskN object specifies a piece of work, a function and its arguments. A new thread may be created to execute this task, or just a work item may be created and added to the work queue of an existing thread. The TaskN class has the following interface:

a constructor that expects an N-ary function object and its N arguments;

a destructor;

export a type definition called future_type; and a mechanism to cast this future_type to the result_type of the function it represents.

A TaskN class 200 is typically a template class with N+1 parameters: N parameters for the N arguments of the function it represents and one parameter for the result type of the function. For example, a ThreadN template class 200 may be used for a Task class. Such a ThreadN class 200 may be defined as follows and as illustrated in FIG. 2:

```
template <class Arg1, class Arg2, . . ., class ArgN, class Result>
class ThreadN : public Thread {
public:
    typedef ThreadN<Arg1, Arg2, . . ., ArgN, Result> future_type;
    ThreadN(ptr_to_N-ary_function<Arg1, Arg2, . . ., ArgN, Result>,
        Arg1, Arg2, . . ., ArgN);
    virtual ~ThreadN ();
    Result operator()(future_type f);
};
```

Future_ptr_fun Adaptor

The future_ptr_fun adaptor is a template function that takes in an N-ary function pointer and builds and returns a future_pointer_t_N-ary_function object. Referring next to FIG. 3, a future_ptr_fun adaptor template function 300 definition in C++ is illustrated. For convenience, this future_ptr_fun adaptor template function definition is also listed below:

```
template <class Arg1, class Arg2, . . ., class ArgN, class Result>
future_pointer_to_N-ary_function<Arg1, Arg2, . . ., ArgN, Result>
    future_ptr_fun(Result (*x)(Arg1, Arg2, . . ., ArgN)) {
        return future_pointer_to_N-ary_function<Arg1, Arg2, . . .,
        ArgN, Result>(x);
}
```

This future_ptr_fun adaptor template function 300 also is parameterized on N+1 parameters: N argument types 310 and one result type 320. The future_ptr_fun 330 takes one argument 340 which is an N-ary function pointer; builds a future_pointer_to_N-ary_function object 360 by passing the N-ary function pointer 340 to the future_pointer_to_N-ary_function object's constructor; and returns the future_pointer_to_N-ary_function object 360.

N=2 Example future_pointer_to_binary_function Template Class and future_ptr_fun Adaptor

To more fully appreciate the N-ary nature of the present invention, the future_pointer_to_binary_function class 410 and the future_ptr_fun adaptor 420 for the case when N=2 is illustrated in FIG. 4. For convenience, the class template and function template are also listed below:

```
future_pointer_to_binary_function template class
    template <class Arg1, class Arg2, class Result>
    class future_pointer_to_binary_function :
    public binary_function<Arg1, Arg2, Result >{
    protected:
        pointer_to_binary_function< Arg1, Arg2, Result>bin_f;
    public:
        typedef Task2 <Arg 1, Arg2, Result>:: future_type future_type;
        future_pointer_to_binary_function(Result (*x)(Arg1,
        Arg2)) : bin_f(ptr_fun(f)){. . .}
        ~future_pointer_to_binary_function() {// clean up task lists }
        future_type operator()(Arg1, Arg2);
    };
future_ptr_fun adaptor template
    template <class Arg1, class Arg2, class Result>
    future_pointer_to_binary_function<Arg1, Arg2, Result>
        future_ptr_fun(Result (*x) (Arg1, Arg2)){
            return future_pointer_to_binary_function<Arg 1,
            Arg2, Result> (x);
    }
```

User Example

Referring now to FIG. 5, an example 500 of user program code illustrates how a user may use the present invention. For convenience, this user program code is also listed below:

```
future_pointer_to_unary_function<int, int>::future_type fval=
    (future_ptr_fun(foo) )(4); . . . // do some unrelated work int
    final=fval+3;
```

The user program code 500 shows how a unary function pointer 505 can be adapted or converted to a future unary function object 510 and the use of this future unary function object 510. In this example 500, int (*foo)(int) is a unary function pointer that expects an integer argument and returns an integer result. In the first statement 530 of this example 500, the following sequence of operations takes place. First, the unary function pointer foo 505 is converted into a future unary function object 510 by the use of the adaptor future_ptr_fun 535. Then the operator '( )' 540 is invoked on the resultant future unary function object 510 with argument 4 545. This results in a task being scheduled to compute foo with argument 4, and a future handle 570 is returned.

In the second statement 550 of the example, the user program code 500 may perform other unrelated computations that do not require the result of the foo function 515.

In the third statement 555 of the example, the result of the foo function 505 is required as the user program code adds an integer 3 560 to the result of the foo function, and assigns the addition result 580 to an integer final 565. Note that fval 570 is of type future_type, while 3 560 is of type integer. As the operator '+' 575 is only defined between similar types (not between dissimilar types such as future_type and integer type), this third statement 555 is valid only if there is a conversion from future_type to the base type of the future_type (integer). The future type provides a cast operator to its 'Result' type so that the future_type fval 570 may be converted to integer and added to the integer 3 560. This cast operator waits for the task to finish, and then returns the value returned by the task which may then be added to the integer 3 560.

Figure 6:
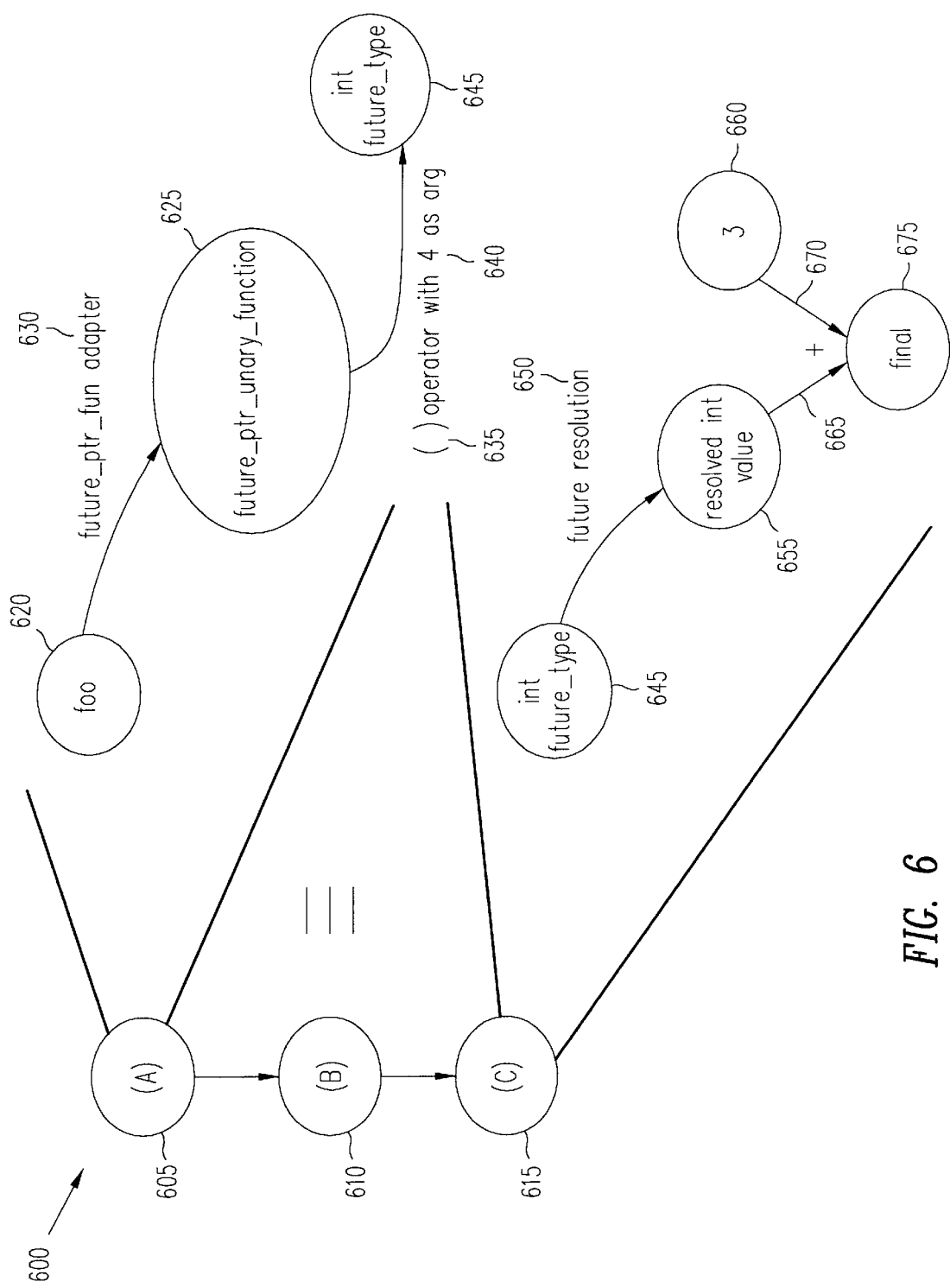
FIG. 6 illustrates an execution graph of the example user code of FIG. 5.

Referring now to FIG. 6, an execution graph 600 of the example user code of FIG. 5 is illustrated. Node A 605 corresponds to the first statement 530 of program code of the example 500, followed by node B 610 corresponding to the second statement 550, followed by node C 615 corresponding to the third statement 555. Execution of the first statement 530 corresponding to node A 605 causes the following sequence of operations takes place. First, the unary function pointer foo, node 620, is converted into a future unary function object, node 625, by the use of the adaptor future_ptr_fun, edge 630. Then the operator '( )', edge 635, is invoked on the resultant future unary function object, node 625, with argument 4 640. This results in a task being scheduled to compute foo 620 with argument 4 640, and a future handle 645 is returned, node 645.

When the third statement 555 of the example corresponding to node 615 executes, the result of the foo function 505, node 620, is required as the user program code adds an integer 3 560, node 660, to the result of the foo function, and assigns the addition result to an integer final 565, node 675. The third statement 555 of the example corresponding to node 615 causes cast operator, edge 650, to perform a future resolution to result type of integer producing the resolved integer result value, node 655. The resolved integer result value, node 655, and the integer type 3, node 660, are added by edges 665 and 670 to produce the integer result final, node 675.

Figure 7:
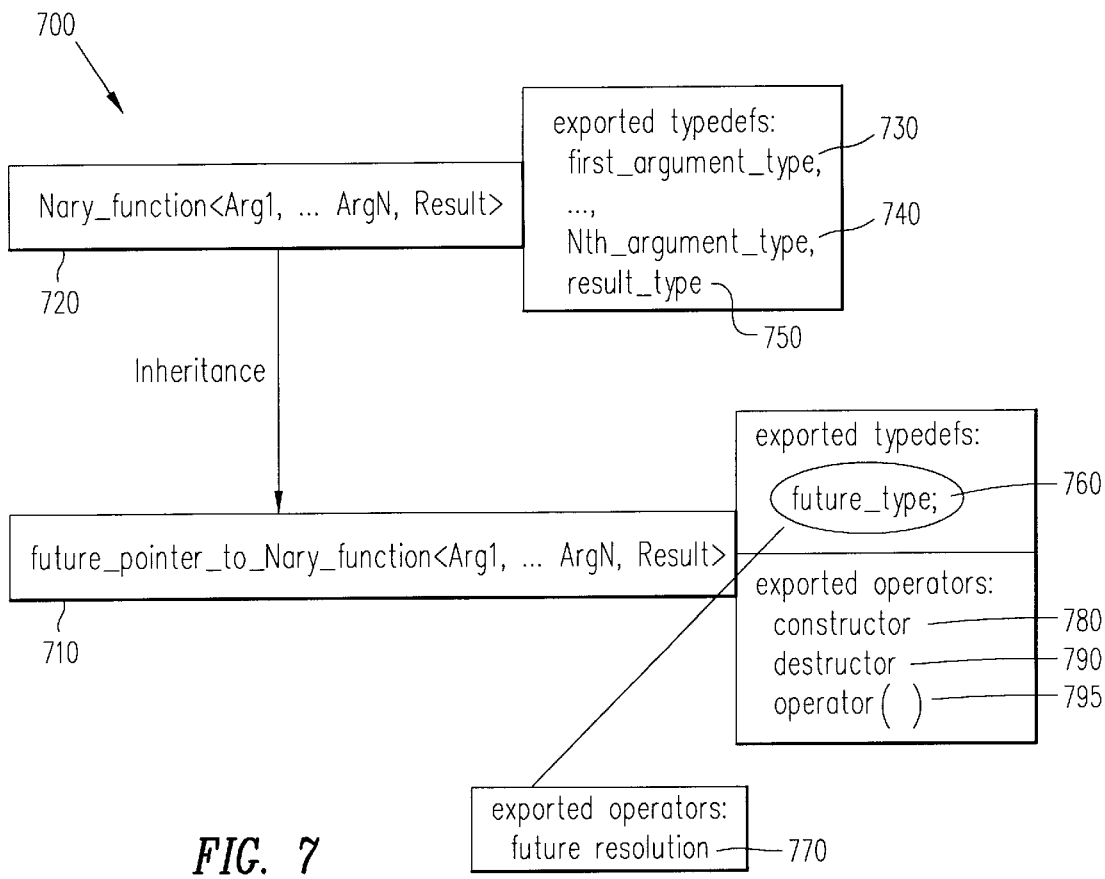
FIG. 7 illustrates a future template class inheritance hierarchy diagram in accordance with the present invention.

Referring now to FIG. 7, a future template class inheritance hierarchy diagram 700 is illustrated. The template class future_pointer_to_N-ary_function<Arg1, . . . , ArgN, Result>710 inherits from the template class N-ary_function<Arg1, . . . , ArgN, Result>720. The template class N-ary_function<Arg1, . . . , ArgN, Result>710 exports N+1 typedefs: first_argument_type 730, . . . , Nth_argument_type 740, and result_type 750.

The template class future_pointer_to-N-ary_function<Arg1, . . . , ArgN, Result>710 exports a typedef of future_type 760 which exports an operator of future resolution 770. The template class future_pointer_to_N-ary_function<Arg1, . . . , ArgN, Result>710 also exports operators: constructor 780, destructor 790, and operator ( ) 795.

Figure 8:
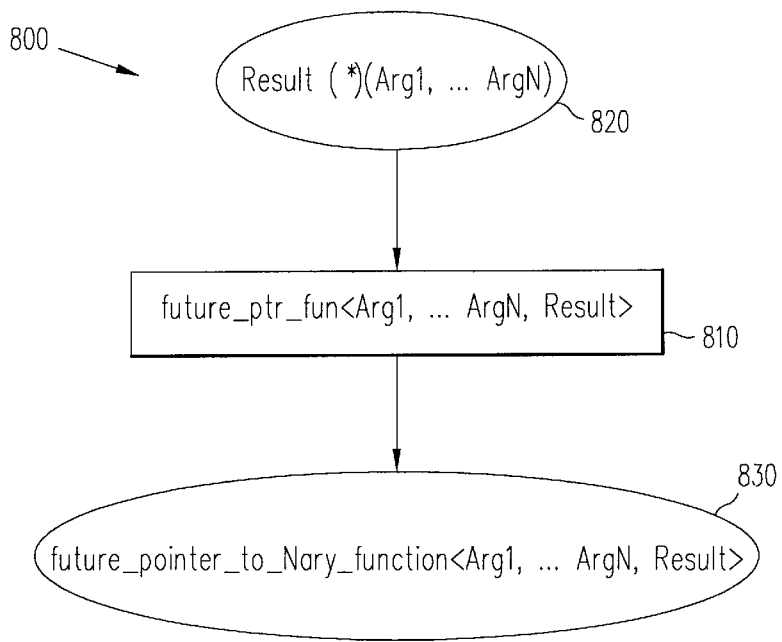
FIG. 8 illustrates a future adaptor function template behavior diagram in accordance with the present invention.

Referring now to FIG. 8, a future adaptor function template behavior diagram 800 is illustrated. The future_ptr_fun<Arg1, . . . , ArgN, Result>810 takes as input Result (*)(Arg1, . . . ArgN) 820, and produces as output future_pointer_to_N-ary_function<Arg1, . . . , ArgN, Result>830.

Figure 9:
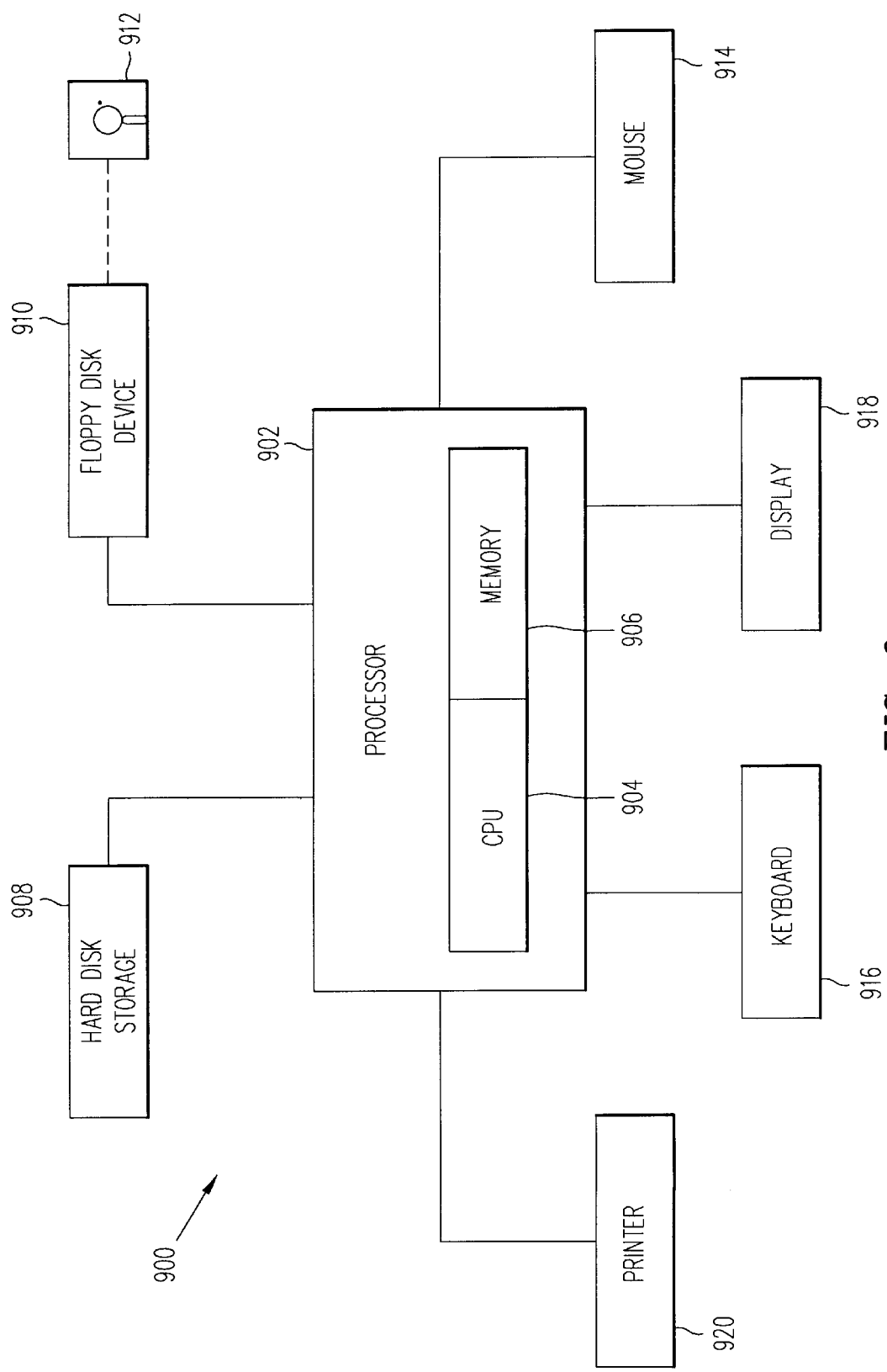
FIG. 9 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 9, a block diagram illustrates a computer system 900 used in performing the method of the present invention, forming part of the apparatus of the present invention, and which may use the article of manufacture comprising a computer-readable storage medium having a computer program embodied in said medium which may cause the computer system to practice the present invention. The computer system 900 includes a processor 902, which includes a central processing unit (CPU) 904, and a memory 906. Additional memory, in the form of a hard disk file storage 908 and a computer-readable storage device 910, is connected to the processor 902. Computer-readable storage device 910 receives a computer-readable storage medium 912 having a computer program embodied in said medium which may cause the computer system to implement the present invention in the computer system 900. The computer system 900 includes user interface hardware, including a mouse 914 and a keyboard 916 for allowing user input to the processor 902 and a display 918 for presenting visual data to the user. The computer system may also include a printer 920.

Although the present invention has been particularly shown and described with reference to a preferred embodiment, it will be understood by those skilled in the art that various changes in form and detail may be made without departing from the spirit and the scope of the invention.

I claim:

1. A method of executing a future by a computer system having a processor and a memory, said future comprising a place-holder for a value of a computation which allows asynchronous computation by enabling delaying the computation of the value until the value is required, said method comprising the steps of:

storing, in the memory of the computer system, an object type of future type wherein the type future type indicates that a future function object has a handle of type future type and that the type of the future function object is convertible from the type future type to a result type;

passing a non-future N-ary function pointer to an adaptor, wherein the non-future N-ary function pointer is a function pointer that accepts N parameters and has a type other than future type, and wherein the non-future N-ary function pointer and the adaptor are stored in the memory of the computer system;

converting from the non-future N-ary function pointer to a future function object of type future type by use of the adaptor, the adaptor building the future function object by passing the non-future N-ary function pointer to a constructor of a future function template class instance, wherein the future function object is also stored in the memory of the computer system; and returning the future function object.

2. The method of claim 1 wherein the adaptor is a generic adaptor template function.

3. The method of claim 1 wherein the future function object is an instance of a future function object template class instance.

4. The method of claim 3 wherein the future function object template class is a subclass of a template class of the non-future function object.

5. The method of claim 3 wherein the future function object template class comprises:

an exported type definition for a future function type defined by the future function object template class;

a constructor which takes a function pointer corresponding to a non-future function object and which saves the function pointer; and a member operator which takes a list of arguments to be passed to the saved function pointer, schedules a task to compute the non-future function object, and returns the future function object.

6. A computer system, having a processor and a memory, for executing a future, said future comprising a place-holder for a value of a computation which allows asynchronous computation by enabling delaying the computation of the value until the value is required, said system comprising:

an object type of future type stored in the memory of the computer system, wherein the type future type indicates that the future function object has a handle of type future type and that the type of the future function object may be converted from the type future type to a result type;

a non-future N-ary function pointer, a function pointer that accepts N parameters and having a type other than future type, stored in the memory of the computer system;

a future function object, stored in the memory of the computer system, having a type of future type; and an adaptor stored in the memory of the computer system, said adaptor causing the processor to convert the non-future N-ary function pointer to the future function object, and said adaptor building the future function object by passing the non-future N-ary function pointer to a constructor of a future function template class instance.

7. The computer system of claim 6 wherein the adaptor is a generic adaptor template function.

8. The computer system of claim 6 wherein the future function object is an instance of a future function object template class instance.

9. The computer system of claim 8 wherein the future function object template class is a subclass of a template class of the non-future function object.

10. The computer system of claim 8 wherein the future function object template class comprises:

an exported type definition for a future function type defined by the future function object template class;

a constructor which takes a function pointer corresponding to a non-future function object and which saves the function pointer; and a member operator which takes a list of arguments to be passed to the saved function pointer, schedules a task to compute the non-future function object, and returns the future function object.

11. An article of manufacture for use in a computer system for executing a future, said future comprising a place-holder for a value of a computation which allows asynchronous computation by enabling delaying the computation of the value until the value is required, said article of manufacture comprising a computer-readable storage medium having a computer program embodied in said medium which may cause the computer system to:

store, in the memory of the computer system, an object type of future type wherein the type future type indicates that the future function object has a handle of type future type and that the type of the future function object is convertible from the type future type to a result type;

pass a non-future N-ary function pointer to an adaptor, wherein the non-future N-ary function pointer is a function pointer that accepts N parameters and has a type other than future type;

convert from the non-future N-ary function pointer to a future function object of type future type by use of the adaptor, the adaptor building the future function object by passing the non-future N-ary function pointer to a constructor of a future function template class instance; and return the future function object.

12. The article of manufacture of claim 11 wherein the adaptor is a generic adaptor template function.

13. The article of manufacture of claim 11 wherein the future function object is an instance of a future function object template class instance.

14. The article of manufacture of claim 13 wherein the future function object template class is a subclass of a template class of the non-future function object.

15. The article of manufacture of claim 13 wherein the future function object template class comprises:

an exported type definition for a future function type defined by the future function object template class;

a constructor which takes a function pointer corresponding to a non-future function object and which saves the function pointer; and a member operator which takes a list of arguments to be passed to the saved function pointer, schedules a task to compute the non-future function object, and returns the future function object.

* * * * *